US 8,077,242 B2

(12) United States Patent
Chung

(10) Patent No.: US 8,077,242 B2
(45) Date of Patent: Dec. 13, 2011

(54) CLOCK MANAGEMENT OF BUS DURING VIEWFINDER MODE IN DIGITAL CAMERA DEVICE

(75) Inventor: PuiYan Chung, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 980 days.

(21) Appl. No.: 11/856,539

(22) Filed: Sep. 17, 2007

(65) Prior Publication Data

US 2009/0073300 A1    Mar. 19, 2009

(51) Int. Cl.
*H04N 5/222* (2006.01)
(52) U.S. Cl. .................................. 348/333.01
(58) Field of Classification Search .......... 348/333.01, 348/333.03
See application file for complete search history.

(56) References Cited

U.S. PATENT DOCUMENTS

| | | | | |
|---|---|---|---|---|
| 6,600,492 B1* | 7/2003 | Shimomura et al. | ......... | 345/501 |
| 6,614,477 B1* | 9/2003 | Lee et al. | ......... | 348/312 |
| 6,813,674 B1* | 11/2004 | Velasco et al. | ......... | 710/311 |
| 7,576,782 B2* | 8/2009 | Nakasuji et al. | ......... | 348/222.1 |
| 7,705,902 B2* | 4/2010 | Matsuoka et al. | ......... | 348/333.01 |
| 7,769,345 B2* | 8/2010 | Johnson et al. | ......... | 455/41.1 |
| 2002/0021364 A1* | 2/2002 | Asada et al. | ......... | 348/312 |
| 2002/0030694 A1* | 3/2002 | Ebihara et al. | ......... | 345/634 |
| 2003/0156212 A1* | 8/2003 | Kingetsu et al. | ......... | 348/333.12 |
| 2004/0001144 A1* | 1/2004 | McCharles et al. | ......... | 348/207.99 |
| 2004/0204144 A1* | 10/2004 | Lim | ......... | 455/566 |
| 2005/0012827 A1* | 1/2005 | Nakasuji et al. | ......... | 348/222.1 |
| 2005/0162529 A1* | 7/2005 | Nakasuji et al. | ......... | 348/222.1 |
| 2006/0103737 A1* | 5/2006 | Okisu et al. | ......... | 348/222.1 |
| 2007/0070212 A1* | 3/2007 | Haneda | ......... | 348/222.1 |
| 2007/0285549 A1* | 12/2007 | Takano | ......... | 348/333.01 |
| 2008/0024642 A1* | 1/2008 | Silverbrook et al. | ......... | 348/333.01 |
| 2008/0291543 A1* | 11/2008 | Nomura et al. | ......... | 359/676 |

* cited by examiner

*Primary Examiner* — Lin Ye
*Assistant Examiner* — Amy Hsu
(74) *Attorney, Agent, or Firm* — Matthew J. Evans; James R. Gambale, Jr.

(57) ABSTRACT

This disclosure describes techniques for managing the clock speed of a bus during viewfinder mode in a digital camera device. The techniques involve determining a frame rate of frames displayed on a viewfinder, determining whether to adjust a clock speed of a bus based at least in part on the determined frame rate, wherein the bus is used to transfer the frames from a camera sensor to the viewfinder, and adjusting the clock speed of the bus upon determining that that the clock speed should be adjusted. The techniques may help ensure that the viewfinder delivers frames at a target frame rate. In addition, in some cases, the techniques may help to reduce power consumption by facilitating clock speed reductions in viewfinder mode.

24 Claims, 3 Drawing Sheets

CLOCK MANAGEMENT OF BUS DURING VIEWFINDER MODE IN DIGITAL CAMERA DEVICE

TECHNICAL FIELD

This disclosure relates to digital camera devices, and more particularly, to clock adjustments to a bus when a digital camera device is in viewfinder mode.

BACKGROUND

Digital cameras are commonly incorporated into a wide variety of devices. In this disclosure, a digital camera device refers to any device that can capture one or more digital images, including devices that can capture still images and devices that can capture sequences of images to record video. By way of example, digital camera devices may comprise stand-alone digital cameras or digital video camcorders, camera-equipped wireless communication device handsets such mobile, cellular or satellite radio telephones, camera-equipped personal digital assistants (PDAs), computer devices that include cameras such as so-called "web-cams," or any devices with imaging or video capabilities.

In digital camera applications, the viewfinder mode refers to a mode in which the digital camera device displays the current view of a camera sensor to the user. The user can examine the viewfinder to determine whether to record a snapshot or record a video sequence. When the user begins recording with the digital camera device, the viewfinder mode may change to an image capture mode (e.g., for snapshots) or a video capture mode (e.g., for video recording). In some digital camera devices, such as stand alone cameras, the viewfinder mode is the default mode of the device. In many digital camera devices, such as mobile phones or PDAs equipped with digital cameras, a camera setting may need to be selected by the user from a plurality of possible operational settings, and the viewfinder mode may comprise a default mode in the camera setting. In some cases, the viewfinder mode can be active while other applications are also active on the device. For example, some mobile phones equipped with digital cameras may be able to handle telephone calls, network searching, internet activity, global positioning system (GPS) functionality, or other applications while in the viewfinder mode. In this case, the user may be able to set the device to a camera setting while talking on the phone, and examine the viewfinder and take snapshots or record video while talking on the phone.

Digital camera devices are often designed to include a bus, which facilitates data transfer between the different modules or units of the device. In computerized architecture, a bus refers to a data transfer subsystem that transfers data or power between computer components. The bus is typically controlled by a bus controller, which may comprise device driver software that executes on a processor of the device. In digital camera applications, the camera sensor may transfer data to the viewfinder over the bus for real-time presentation to the user. At the same time, one or more other units of the device may also use the same bus to transfer other data.

SUMMARY

This disclosure describes techniques for managing the clock speed of a bus during viewfinder mode in a digital camera device. The bus is used to transfer video frames from a camera sensor to a viewfinder. The techniques may involve determining a frame rate of frames displayed on the viewfinder, and determining whether to adjust a clock speed of a bus based at least in part on the determined frame rate.

The techniques may further involve adjusting the clock speed of the bus upon determining that that the clock speed should be adjusted. The techniques may help to ensure that the viewfinder delivers frames at or near a target frame rate. In addition, in some cases, the techniques may help to reduce power consumption by facilitating clock speed reductions when the device is in viewfinder mode.

In one example, this disclosure provides a method comprising determining a frame rate of video frames displayed on a viewfinder, determining whether to adjust a clock speed of a bus based at least in part on the determined frame rate, wherein the bus is used to transfer the frames from a camera sensor to the viewfinder, and adjusting the clock speed of the bus upon determining that that the clock speed should be adjusted.

In another example, this disclosure provides an apparatus comprising a viewfinder, a camera sensor, a bus used to transfer video frames of video data from the camera sensor to the viewfinder, and a bus controller. The bus controller determines a frame rate of frames displayed on the viewfinder, determines whether to adjust a clock speed of the bus based at least in part on the determined frame rate, and adjusts the clock speed of the bus upon determining that that the clock speed should be adjusted.

In another example, this disclosure provides a device comprising means for capturing video frames of video data, means for displaying the frames to a user, means for transferring the frames from the means for capturing to the means for displaying, and means for controlling the means for transferring. The means for controlling determines a frame rate of frames displayed on the means for displaying, determines whether to adjust a clock speed of the means for transferring based at least in part on the determined frame rate, and adjusts the clock speed of the means for transferring upon determining that that the clock speed should be adjusted.

These and other techniques described herein may be implemented in hardware, software, firmware, or any combination thereof. If implemented in software, the software may be executed in a processor, such as a general purpose microprocessor, digital signal processor (DSP), application specific integrated circuit (ASIC), field programmable gate array (FPGA) or other type of processor. For example, the software may comprise a driver for the bus. Such software may be initially stored in a computer-readable medium and loaded and executed in the processor to facilitate control of the bus.

Accordingly, this disclosure also contemplates a computer-readable medium comprising instructions that upon execution in a digital camera device, cause the device to determine a frame rate of video frames displayed on a viewfinder, determine whether to adjust a clock speed of a bus based at least in part on the determined frame rate, wherein the bus is used to transfer the frames from a camera sensor to the viewfinder, and adjust the clock speed of the bus upon determining that that the clock speed should be adjusted.

In addition, this disclosure also contemplates an integrated circuit configured to determine a frame rate of video frames displayed on a viewfinder, determine whether to adjust a clock speed of a bus based at least in part on the determined frame rate, wherein the bus is used to transfer the frames from a camera sensor to the viewfinder, and adjust the clock speed of the bus upon determining that that the clock speed should be adjusted.

The details of one or more embodiments are set forth in the accompanying drawings and the description below. Other features, objects, and advantages will be apparent from the description and drawings, and from the claims.

DETAILED DESCRIPTION

This disclosure describes techniques for managing the clock speed of a data transfer bus during operation in a viewfinder mode in a digital camera device. A digital camera device refers to any device that can capture one or more images, including devices that can capture still images and devices that can capture sequences of images to record video. The techniques of this disclosure involve determining a frame rate of frames displayed on a viewfinder, determining whether to adjust a clock speed of a bus based at least in part on the determined frame rate, wherein the bus is used to transfer the frames from a camera sensor to the viewfinder, and adjusting the clock speed of the bus upon determining that that the clock speed should be adjusted. The techniques may help to ensure that the viewfinder presents the frames to a user at a target frame rate. In addition, in some cases, the techniques may help to reduce power consumption by facilitating clock speed reductions in the viewfinder mode, e.g., when the bus has more than enough clock speed to communicate the frames between the camera sensor and the viewfinder at the target frame rate.

Figure 1:
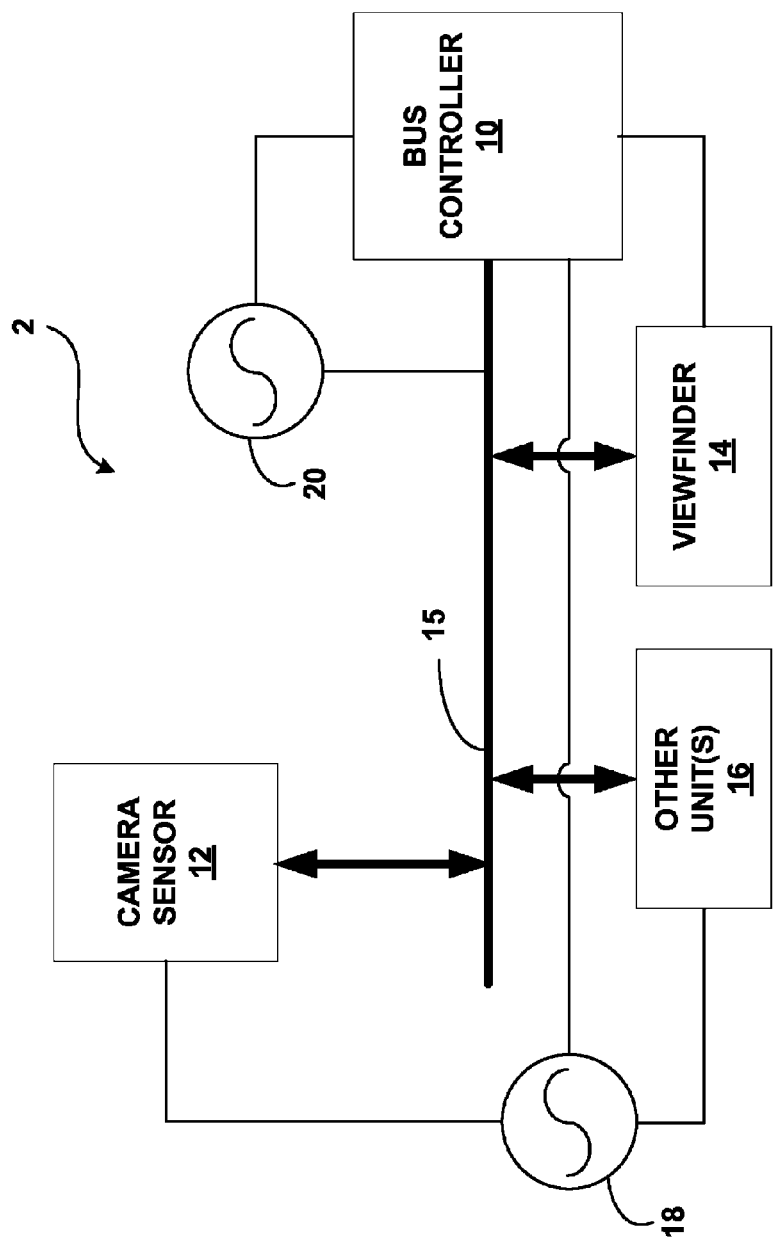
FIG. 1 is a block diagram of an exemplary digital camera device that implements the techniques of this disclosure.

FIG. 1 is a block diagram illustrating an exemplary digital camera device 2 that implements the techniques of this disclosure. By way of example, digital camera device 2 may comprise a stand-alone digital camera, a digital video camcorder, a camera-equipped wireless communication device handset such as a cellular or satellite radio telephone, a camera-equipped personal digital assistant (PDA), a computer device equipped with a digital camera, web-cam or the like, or any other device with imaging or video capabilities.

As shown in FIG. 1, device 2 comprises a camera sensor 12 that captures frames of data and communicates the frames to a viewfinder 14 for real-time presentation to a user. The frames may comprise video frames (also commonly referred to as image frames or camera frames), and may comprise raw pixel data or possibly captured image data that is down sampled or processed in some manner. In some cases, for example, video frame processing elements and memory buffers (not shown) may be used to facilitate the processing of frames captured by camera sensor prior to transfer to viewfinder 14. In other cases, however, raw pixel data may be transferred from camera sensor 12 to viewfinder 14 as the data is captured. The frames may collectively form a video sequence, with successive frames capturing changes in the view of camera sensor 12.

Viewfinder 14 may comprise the component that displays raw or processed frames of data in real time, and in some cases may itself include pre-processing elements and memory buffers e.g., to facilitate down sampling or other image or video pre-processing. In any case, bus 15 facilitates the transfer of data (e.g., the frames of video data) from camera sensor 12 to viewfinder 14. Viewfinder 14 then presents the video frames to the user in real time.

Device 2 may also comprise one or more other units 16. The one or more other units 16 may also use bus 15 to transfer information or power within device 2. A system clock 18 controls the clock speed of camera sensor 12 and may also control the clock speed of one or more other units 16. In one example, system clock 18 may comprise a pixel clock of sensor 12 that sets a speed for the speed of sensor 12, and therefore a minimum speed for clock 20 associated with bus 15. Clock 20 is associated with bus 15, and defines the clock speed for data transfer over bus 15. Clocks 18 and 20 may be controllable, and may comprise any of a wide variety of voltage controlled oscillators, current controlled oscillators, or the like.

A bus controller 10 may control and manages operation of bus 15. Bus controller 10 may comprise a software driver application that executes on a processor of device 2. For example, the software may be stored on a computer-readable medium such as volatile or non-volatile computer storage. If bus controller 10 is implemented in software, a processor of device 2 that executes such software may comprise a general purpose microprocessor, a DSP, an ASIC, an FPGA, or other type of processor. In any case, bus controller 10 controls bus 15, and may provide adjustments to clock 20 in order to ensure that viewfinder 14 is able to receive frames at a target frame rate, and, in some cases, to reduce power consumption by reducing the speed of clock 20.

Bus controller 10, for example, may comprise a conventional bus controller application or circuit for managing the basic operation of bus 15, with an additional module that executes the techniques of this disclosure and supplies a clock speed decision to the conventional bus controller application or circuit. In other words, the techniques of this disclosure may be realized by incorporating an additional circuit or software module to operate independently of a conventional bus controller. In any case, as used here, bus controller 10 refers to the component that executes the techniques of this disclosure whether or not bus controller 10 also controls other functions associated with a conventional bus controller.

In accordance with this disclosure, "viewfinder mode" refers to a mode of device 2 in which camera sensor 12 communicates captured frames to viewfinder 14, and viewfinder 14 presents the frames to the user in real-time. Again, raw data captured by camera sensor 12 may be communicated, and in some cases, processing, pre-processing, down sampling or the like, may occur at viewfinder 14, or by separate components of device 2. As the frames of video data are delivered from camera sensor 12 to viewfinder 14, the data can be displayed on viewfinder 14. The user can examine viewfinder 14 to determine whether to cause device 2 to record a snapshot or to record a video sequence. Once recording begins, the viewfinder mode may change to an image capture mode (e.g., for snapshots) or a video capture mode (e.g., for video recording). Other units 16, for example, may comprise recording units, encoding units, or the like, to facilitate image or video recording of frames as they are captured by camera sensor 12. Other units 16 may also comprise input and output units to facilitate input of data from users and output of data to users. In addition, other units 16 may include any other units or components, which may vary depending on the type of device.

In accordance with this disclosure, when device 2 is in viewfinder mode, bus controller 10 determines a frame rate of frames displayed on viewfinder 14, and determines whether to adjust the speed of clock 20 based at least in part on the determined frame rate. As described in greater detail below, several additional factors may also affect this decision of whether to adjust the speed of clock 20, and the extent and scope of such adjustments. In any case, upon determining that clock 20 should be adjusted, bus controller 10 adjusts clock 20 to thereby adjust the clock speed of bus 15. In this manner, bus controller 10 can help to ensure that viewfinder 14 can receive and therefore deliver frames to a user at a target frame rate. For example, if bus 15 is transferring large amounts of data due to operation of other units 16, it may be necessary to increase the clock speed of bus 15 to ensure that camera sensor 12 can deliver the frames to viewfinder 14 at the target frame rate. In addition, in some cases, bus controller 10 can help to reduce power consumption by facilitating clock speed reductions to clock 20 when the clock speed is otherwise excessive.

In one exemplary embodiment, device 2 may comprise a wireless communication device such as a cellular or satellite radio telephone handset. In this case, other units 16 may include a searcher unit that searches for wireless signals from base stations and determines which base station to use for wireless communication. Furthermore, other units 16 may include one or more call units or data units to facilitate encoding and decoding of data or voice information. Other units 16 may also include a transmitter and receiver, and possibly a global positioning system (GPS) unit. If device 2 supports multimedia encoding and decoding, other units 16 may include audio and video CODECs (encoder-decoders). In addition, other units 16 may include one or more output devices to output audio voice information, or to display data information, search information, call information, or GPS information to a user.

Bus 15 of device 2 may support a wide variety of data communication within device 2 during viewfinder mode. That is to say, bus 15 of device 2 may transfer audio information, video information, data, search information, call information, or GPS information to one or more output devices while camera sensor 12 communicates captured image frames to viewfinder 14. Bus 15 of device 2 may also be used to transfer received input from the user of device 2. In these cases, bus controller 10 may determine that the frame rate at viewfinder 14 is below a target frame rate because the current bus speed defined by clock 20 is insufficient to support the current amount of data or information data that needs to be communicated. Accordingly, bus controller 10 may cause clock 20 to increase its clock speed. Again, clock 20 may comprise any adjustable or controllable clock, such as a voltage controlled oscillator, current controlled oscillator, or the like. Appropriate control signals may be provided to clock 20 at the direction of bus controller 10 to facilitate any clocking adjustments to bus 15.

Alternatively, in some cases, bus controller 10 may determine that the current bus speed is excessive. In this case, bus controller 10 may cause clock 20 to decrease its clock speed in order to conserve power. For example, bus controller 10 may determine that the frame rate at viewfinder 14 is above the target frame rate. Accordingly, clock speed reductions may be performed without compromising the ability to display frames on viewfinder 14 at the target frame rate. Additional factors may also be used by bus controller 10 to determine whether or not to increase or decrease the frame rate. These factors may include determinations of whether the target frame rate has changed, whether the clock speed of system clock 18 has changed, and whether an average update time on viewfinder 14 is above and/or below threshold values. As described in greater detail below, the average update time refers to an amount of time that it takes device 2 to display a video frame, with or without manual changes or input from the user to modify the video frame. For example, viewfinder 14 may support scrolling, zooming or other manually adjustable features that are responsive to user input, e.g., received via other units 16. In this case, even if frame rate at viewfinder 14 is below the target frame rate, if the average update time on viewfinder 14 is sufficiently small, increases in the clock speed associated with bus 15 may be avoided. User input, for example, may cause frames to be dropped, thereby causing a temporary frame rate decrease due to user interaction. Accordingly, if the user is interacting with device 2, it may be undesirable to increase the clock speed associated with bus 15 if the average update time is sufficiently small.

Figure 2:
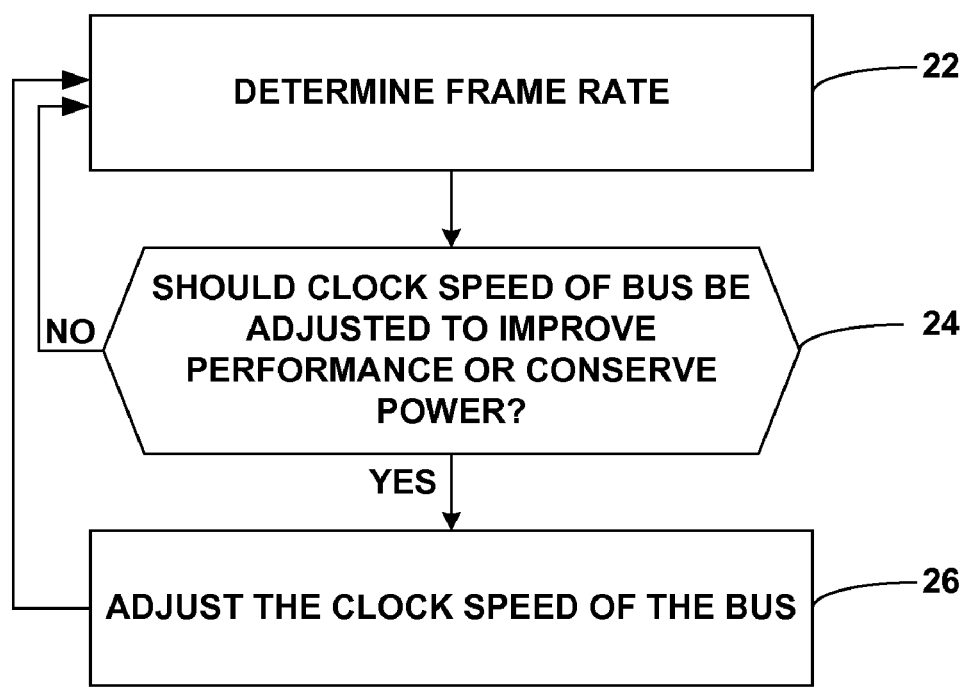
FIG. 2 is a flow diagram illustrating an exemplary technique in which a frame rate of a viewfinder is used to determine whether to adjust a clock speed of a bus according to this disclosure.

FIG. 2 is a flow diagram illustrating an exemplary technique in which a frame rate of viewfinder 14 is used to determine whether to adjust a clock speed of bus 15 according to this disclosure. As shown in FIG. 2, bus controller 10 determines the frame rate at viewfinder 14 (22). For example, the frame rate at viewfinder 14 may be measured by bus controller 10 on an ongoing basis, or viewfinder 14 may be designed to report its frame rate to bus controller 10 at periodic intervals. In accordance with this disclosure, bus controller 10 may not need to determine the actual amount of data in any of the frames, but merely determines the frame rate. The frame rate is the rate at which frames are actually presented or displayed to the user by viewfinder 14. This frame rate may be similar or different than the rate at which the frames of data are captured by camera sensor 12, possibly due to the clock speed of bus 15.

Bus controller 10 determines whether the clock speed of bus 15 should be adjusted to improve performance or conserve power (24). In particular, bus controller 10 may determine that the frame rate at viewfinder 14 is below a target frame rate because the current bus speed defined by clock 20 is insufficient to support the current amount of data that needs to be communicated. Bus controller 10 may make this determination solely based on the frame rate at viewfinder 14, and may not need to actually determine the amount of data transferred over bus 15. In other cases, bus controller 10 may determine that the current bus speed is excessive or more than sufficient to support the target frame rate at viewfinder 14, e.g., in the case where few or none of other units 16 are currently using bus 15 to transfer data.

Whenever bus controller 10 determines that the clock speed should be adjusted (yes branch of 24), the clock speed of bus 15 is adjusted (26). For example, if bus controller 10 determines that the frame rate at viewfinder 14 is below a target frame rate because the current bus speed defined by clock 20 is insufficient to support the current load of data that needs to be communicated, bus controller 10 may cause clock 20 to increase its clock speed. Alternatively, if bus controller 10 determines that the frame rate at viewfinder 14 is above the target frame rate or if the update time is sufficiently small, bus controller 10 can cause clock speed reductions to clock 20 associated with bus 15 without compromising the ability of viewfinder 14 to display frames at the target frame rate. The target frame rate may have many possible values or ranges of values. Examples of target frame rates include rates of 30 frames per second (FPS), 15 FPS, and 7.5 FPS.

Figure 3:
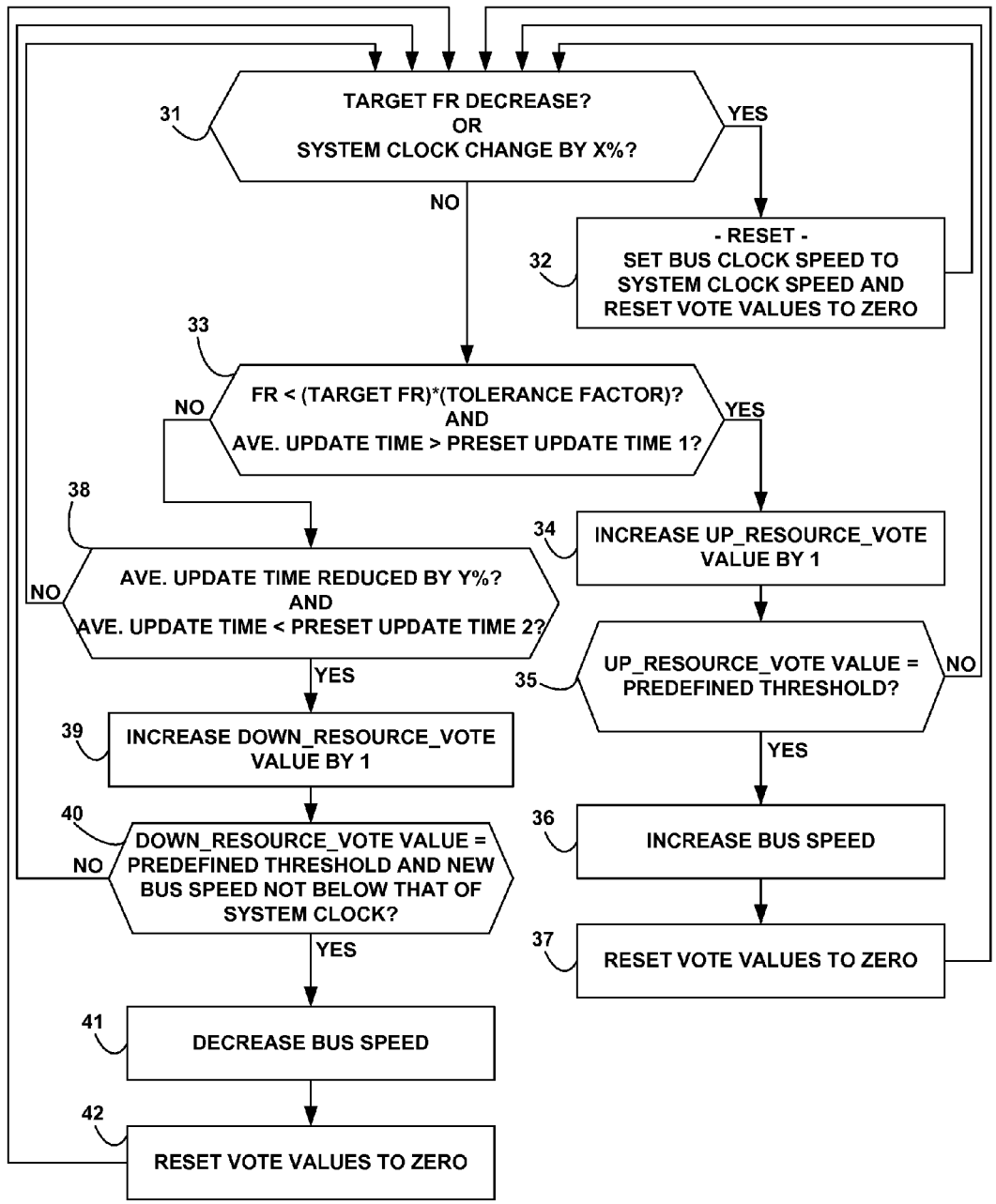
FIG. 3 is a more detailed flow diagram illustrating an exemplary technique in which a frame rate of a viewfinder is used to determine whether to adjust a clock speed of a bus according to this disclosure.

FIG. 3 is a more detailed flow diagram illustrating an exemplary technique in which bus controller 10 uses a frame rate of viewfinder 14 (and other factors) to determine whether to adjust a clock speed associated with bus 15 according to this disclosure. As shown in FIG. 3, bus controller 10 determines whether there is a target frame rate (FR) decrease or whether system clock 18 has changed by a pre-determined percentage X (31). As examples, X may be between approximately 3 and 30 percent, and more specifically between approximately 5 and 15 percent. In particular, X may be equal to approximately 10 percent. The pre-determined percentage X may be an adjustable or programmable parameter. If bus controller 10 determines that there has been a target frame rate decrease (yes branch of 31), bus controller 10 "Resets" bus 15 (32), e.g., by setting the clock speed of clock 20 associated with bus 15 to that of system clock 18 and resetting any vote values to zero. Vote values are discussed in more detail below, but are generally used to require several determinations prior to an adjustment to bus 15. By way of example, target frame rate decreases may be caused by a manual adjustment of the target frame rate by the user, or possibly automatically as part of an auto-frame rate algorithm in camera sensor 12 or device 2 that adjusts the target frame rate in response to lighting changes.

If bus controller 10 determines that system clock has changed by X percent (yes branch of 31), bus controller 10 also "Resets" bus 15 (32), e.g., by setting the clock speed of clock 20 associated with bus 15 to that of system clock 18 and resetting any vote values (discussed below) to zero. Changes to system clock 18 may be caused by any of a number of reasons. For example, if sensor 12 is adjusted to operate at a higher frame rate, this may require a faster system clock. In this case, e.g., if the speed of system clock 18 increases, camera sensor 12 may operate at a speed that is faster than clock 20. Accordingly, it may be necessary to increase the speed of clock 20 associated with bus 15 to be at or above the speed of system clock 18, which may be a minimum requirement to ensure that data overflow of bus 15 does not occur.

If there is no target frame rate decrease and system clock 18 has not changed by X percent (no branch of 31), bus controller 10 determines whether (A) the frame rate of viewfinder 14 is less than the target frame rate multiplied by a tolerance factor, and whether (B) an average update time associated with the viewfinder is greater than a preset update time (33). These determinations of step 33 (as well as the other determinations of FIG. 3) may be performed in periodic intervals of time, such as every 300 milliseconds. The frame rate at viewfinder 14 may be measured by bus controller 10 on an ongoing basis, or viewfinder 14 may be designed to report its frame rate to bus controller 10 at the periodic intervals. Again, the frame rate at viewfinder 14 refers to the actual rate at which frames are displayed to the user.

The average update time refers to amount of time that it takes device 2 to display a video frame, i.e., with or without manual changes or input from a user to modify the video frames. For example, viewfinder 14 may support zooming, scrolling or other manually adjustable features that are responsive to user input. For example, zooming may allow the user to zoom in to a sub-area of frames, and scrolling may allow the user to scroll to different areas of the frames within a zoomed view. When the user interacts with device 2, e.g., to adjust the zooming, frames may be dropped, which can affect the measured frame rate. The average update time quantifies the average amount of time that it takes viewfinder 14 to display a video frame with or without manual input from a user. Again, the manual input, for example, may be related to scrolling or zooming of the screen displayed by viewfinder 14.

The preset update time in step 33 may comprise a first preset update time, and may comprise a programmable and adjustable value. For example, the first preset update time may be defined as:

$$1000/(\text{target frame rate})/\text{up\_factor}.$$

The value for up_factor may be programmable or adjustable, making the first preset update time adjustable. As an example, up_factor may be set to a value of approximately 1.3.

If bus controller 10 determines that the frame rate of viewfinder 14 is less than the target frame rate multiplied by a tolerance factor, and that an average update time associated with the viewfinder is greater than a preset update time, wherein the average update time refers to an average amount of time that it takes the viewfinder to display a video frame (yes branch of 33), bus controller 10 may increase up_resource_vote value by 1 (34). Then, if up_resource_vote equals a predefined threshold associated with up_resource_vote (yes branch of 35), bus controller 10 increase the clock speed of bus 15, e.g., by increasing the speed of clock 20. As an example, the predefined threshold associated with up_resource_vote may be 3, meaning that three votes are needed to cause a bus speed increase. The predefined threshold defined for up_resource_vote may be a programmable or adjustable value. Bus speed increases may occur in increments, such as 1 kilohertz increments. In addition, in some cases, consecutive upward adjustments to up_resource_vote may be required in order to cause an increase in the clock speed. In this case, any adjustments to down_resource_vote (addressed below) may cause a reset of up_resource_vote to zero. Similarly, any upward adjustments to up_resource_vote may cause down_resource_vote to reset to zero.

Following a bus speed increase (36), vote values (e.g., up_resource_vote and down_resource_vote) may be set back to zero (37). If desired, the voting concept can be eliminated altogether, and bus speed increases may occur when bus controller 10 determines that the frame rate of viewfinder 14 is less than the target frame rate multiplied by a tolerance factor, and that an average update time associated with the viewfinder is greater than a preset update time (yes branch of 33). That is to say, steps 34 and 35 are optional, and could be eliminated such that bus speed increases (36) occur any time the contingencies of step 33 are met.

If bus controller 10 determines that either of the contingencies of step 33 are not true (no branch of 33), then bus controller determines the contingencies of step 38. That is to say, if bus controller 10 determines that either the frame rate of viewfinder 14 is not less than the target frame rate multiplied by a tolerance factor, or that an average update time associated with the viewfinder is not greater than a preset update time (no branch of 33), bus controller considers step 38.

In step 38, bus controller 10 determines whether (C) the average update time has reduced by an amount Y, wherein Y is a pre-determined percentage associated with the update time and whether (D) the average update time is less than a second preset update time. As an example, the pre-determined percentage Y associated with the update time may comprise a value between approximately 1 and 5 percent, or more specifically between approximately 2 and 4 percent. For example, Y may have a value of approximately 3 percent. In some cases, Y may be programmable. The second present update time may be defined as:

$$1000/(\text{the target frame rate})/\text{down\_factor},$$

wherein down_factor is a programmable or adjustable value. If down_factor is adjustable, this also makes the second preset update time adjustable. As an example, down_factor may be set to a value of approximately 1.44.

If either of the contingencies of step 33 (defined above as (A) and (B)) is not true, and both contingencies of step 38 (defined above as (C) and (D)) are true (yes branch of 38), then bus controller 10 may increase down_resource_vote value by 1 (39). Then, if down_resource_vote equals a pre-defined threshold defined for down_resource_vote and a new bus speed for clock 20 associated with bus 15 will not be below that of system clock 18 (yes branch of 40), bus controller 10 decreases the clock speed of bus 15 (41), e.g., by decreasing the speed of clock 20. The predefined threshold defined for down_resource_vote may be set to 2, meaning that two votes are needed to cause a bus speed decrease. The predefined threshold defined for down_resource_vote may be a programmable or adjustable value. As noted above, in some cases, consecutive adjustments to down_resource_vote may be required in order to cause a decrease in the clock speed. In this case, any upward adjustments to up_resource_vote may cause down_resource_vote to reset to zero. Similarly, adjustments to down_resource_vote may cause a reset of up_resource_vote to zero.

Bus speed decreases may occur in increments, such as 1 kilohertz increments. Alternatively, bus speed decreases may be defined as follows:

New Bus Speed(kilohertz)=(Current Bus Speed(kilohertz)*Average Update Time(milliseconds)*Target Frame Rate*down_factor)/1000.

Following a bus speed decrease (41), vote values (e.g., up_resource_vote and down_resource_vote) may be set back to zero (42). As noted above, the voting concept can be eliminated altogether in some examples, and in this case, bus speed decreases may occur when bus controller 10 determines that at least one of the contingencies of step 33 (defined above as (A) and (B)) is not true, and both contingencies (C) and (D) of step 38 are true (yes branch of 38).

The process shown in FIG. 3 may repeat in pre-defined time increments, such as time increments of approximately 300 milliseconds. By facilitating control over the clock speed of bus 15, the techniques of this disclosure allow bus controller 10 to ensure that a target frame rate can always be achieved at viewfinder 14. Furthermore, in cases where the clock speed is otherwise excessive for the current amount of data being transferred over bus 15, the techniques of this disclosure can facilitate reductions in power consumption by device 2 by facilitating clock speed reductions in clock 20 associated with bus 15.

The techniques described herein may be implemented in hardware, software, firmware or any combination thereof. Any of the described units, modules or components may be implemented together in an integrated logic device or separately as discrete but interoperable logic devices. If implemented in software, the techniques may be realized at least in part by a computer-readable medium comprising instructions that, when executed, performs one or more of the techniques described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules, hardware modules, or any combination thereof.

If implemented in hardware or a combination of hardware and software, the techniques described herein may be embodied in an apparatus, device or integrated circuit, which may comprise some or all of the components shown in FIG. 1. An integrated circuit, for example, can be configured to perform one or more of the techniques described herein. In that case, an integrated circuit may be configured to determine a frame rate of video frames displayed on a viewfinder, determine whether to adjust a clock speed of a bus based at least in part on the determined frame rate, wherein the bus is used to transfer the frames from a camera sensor to the viewfinder, and adjust the clock speed of the bus upon determining that that the clock speed should be adjusted.

These and other examples are within the scope of the following claims.

The invention claimed is:

1. A method comprising:
   determining a frame rate of video frames displayed on a viewfinder;
   determining whether to adjust a clock speed of a bus based at least in part on the determined frame rate, wherein the bus is used to transfer the frames from a camera sensor to the viewfinder; and
   adjusting the clock speed of the bus upon determining that that the clock speed should be adjusted.

2. The method of claim 1, further comprising:
   determining that a target frame rate for the viewfinder has decreased; and
   setting the clock speed of the bus to a clock speed associated with a system clock.

3. The method of claim 1, further comprising:
   determining that a clock speed associated with a system clock has changed by an amount X, wherein the amount X is a pre-determined percentage associated with the system clock; and
   setting the clock speed of the bus to the clock speed associated with the system clock.

4. The method of claim 1, further comprising:
   determining whether:
     (A) the frame rate is less than a target frame rate for the viewfinder multiplied by a tolerance factor; and
     (B) an average update time associated with the viewfinder is greater than a preset update time, wherein the average update time refers to an average amount of time that it takes the viewfinder to display a video frame; and
   increasing the clock speed of the bus when (A) and (B) are true.

5. The method of claim 1, further comprising:
   for pre-defined time increments determining whether:
     (A) the frame rate is less than a target frame rate for the viewfinder multiplied by a tolerance factor; and
     (B) an average update time associated with the viewfinder is greater than a preset update time, wherein the average update time refers to an average amount of time that it takes the viewfinder to display a video frame;
   increasing an up_resource_vote value each time that (A) and (B) are true; and increasing the clock speed of the bus when the up_resource_vote value equals a pre-defined threshold associated with the up_resource_vote value.

6. The method of claim 1, further comprising:
determining whether:
  (A) the frame rate is less than a target frame rate for the viewfinder multiplied by a tolerance factor; and
  (B) an average update time associated with the viewfinder is greater than a preset update time, wherein the average update time refers to an average amount of time that it takes the viewfinder to display a video frame; and
if either (A) or (B) is not true, determining whether:
  (C) the average update time has reduced by an amount Y, wherein Y is a pre-determined percentage associated with the update time; and
  (D) the average update time is less than a second preset update time; and
decreasing the clock speed of the bus when either (A) or (B) is not true and (C) and (D) are true.

7. The method of claim 1, further comprising:
for pre-defined time increments determining whether:
  (A) the frame rate is less than a target frame rate for the viewfinder multiplied by a tolerance factor; and
  (B) an average update time associated with the viewfinder is greater than a preset update time, wherein the average update time refers to an average amount of time that it takes the viewfinder to display a video frame; and
if either (A) or (B) is not true, determining whether:
  (C) the average update time has reduced by an amount Y, wherein Y is a pre-determined percentage associated with the update time; and
  (D) the average update time is less than a second preset update time;
increasing a down_resource_vote value each time that either (A) or (B) is not true and (C) and (D) are true; and
decreasing the clock speed of the bus when the down_resource_vote value equals a pre-defined threshold associated with the down_resource_vote value.

8. The method of claim 1, further comprising for pre-defined time increments:
determining whether a target frame rate for the viewfinder has decreased;
setting the clock speed of the bus to a clock speed associated with a system clock when the target frame rate has decreased;
determining whether the clock speed associated with the system clock has changed by an amount X, wherein the amount X is a pre-determined percentage associated with the system clock;
setting the clock speed of the bus to the clock speed associated with the system clock when the system clock has changed by the amount X;
determining whether:
  (A) the frame rate is less than the target frame rate for the viewfinder multiplied by a tolerance factor; and
  (B) an average update time associated with the viewfinder is greater than a preset update time, wherein the average update time refers to an average amount of time that it takes the viewfinder to display a video frame;
increasing an up_resource_vote value each time that (A) and (B) are true;
increasing the clock speed of the bus when the up_resource_vote value equals a first pre-defined threshold associated with the up_resource_vote value;
if either (A) or (B) is not true, determining whether:
  (C) the average update time has reduced by an amount Y, wherein Y is a pre-determined percentage associated with the update time; and
  (D) the average update time is less than a second preset update time;
increasing a down_resource_vote value each time that either (A) or (B) is not true and (C) and (D) are true; and
decreasing the clock speed of the bus when the down_resource_vote value equals a second pre-defined threshold associated with the down_resource_vote value.

9. The method of claim 8, wherein the first and second preset update times are defined by adjustable values.

10. The method of claim 8, wherein the first and second pre-defined thresholds are defined by adjustable values.

11. An apparatus comprising:
a viewfinder;
a camera sensor;
a bus used to transfer video frames of video data from the camera sensor to the viewfinder; and
a bus controller that:
determines a frame rate of frames displayed on the viewfinder;
determines whether to adjust a clock speed of the bus based at least in part on the determined frame rate; and
adjusts the clock speed of the bus upon determining that that the clock speed should be adjusted.

12. The apparatus of claim 11, further comprising a system clock that clocks the camera sensor, wherein the bus controller:
determines that a target frame rate for the viewfinder has decreased; and
sets the clock speed of the bus to a clock speed associated with the system clock.

13. The apparatus of claim 11, further comprising a system clock that clocks the camera sensor, wherein the bus controller:
determines that a clock speed associated with the system clock has changed by an amount X, wherein the amount X is a pre-determined percentage associated with the system clock; and
sets the clock speed of the bus to the clock speed associated with the system clock.

14. The apparatus of claim 11, wherein the bus controller:
determines whether:
  (A) the frame rate is less than a target frame rate for the viewfinder multiplied by a tolerance factor; and
  (B) an average update time associated with the viewfinder is greater than a preset update time, wherein the average update time refers to an average amount of time that it takes the viewfinder to display a video frame; and
increases the clock speed of the bus when (A) and (B) are true.

15. The apparatus of claim 11, wherein the bus controller:
for pre-defined time increments determines whether:
  (A) the frame rate is less than a target frame rate for the viewfinder multiplied by a tolerance factor; and
  (B) an average update time associated with the viewfinder is greater than a preset update time, wherein the average update time refers to an average amount of time that it takes the viewfinder to display a video frame;
increases an up_resource_vote value each time that (A) and (B) are true; and increases the clock speed of the bus when the up_resource_vote value equals a pre-defined threshold associated with the up_resource_vote value.

16. The apparatus of claim 11, wherein the bus controller: determines whether:
   (A) the frame rate is less than a target frame rate for the viewfinder multiplied by a tolerance factor; and
   (B) an average update time associated with the viewfinder is greater than a preset update time, wherein the average update time refers to an average amount of time that it takes the viewfinder to display a video frame; and
   if either (A) or (B) is not true, determines whether:
      (C) the average update time has reduced by an amount Y, wherein Y is a pre-determined percentage associated with the update time; and
      (D) the average update time is less than a second preset update time; and
   decreases the clock speed of the bus when either (A) or (B) is not true and (C) and (D) are true.

17. The apparatus of claim 11, wherein the bus controller: for pre-defined time increments determines whether:
   (A) the frame rate is less than a target frame rate for the viewfinder multiplied by a tolerance factor; and
   (B) an average update time associated with the viewfinder is greater than a preset update time, wherein the average update time refers to an average amount of time that it takes the viewfinder to display a video frame; and
   if either (A) or (B) is not true, determines whether:
      (C) the average update time has reduced by an amount Y, wherein Y is a pre-determined percentage associated with the update time; and
      (D) the average update time is less than a second preset update time;
   increases a down_resource_vote value each time that either (A) or (B) is not true and (C) and (D) are true; and
   decreases the clock speed of the bus when the down_resource_vote value equals a pre-defined threshold associated with the down_resource_vote value.

18. The apparatus of claim 11, wherein for pre-defined time increments the bus controller:
   determines whether a target frame rate for the viewfinder has decreased;
   sets the clock speed of the bus to a clock speed associated with a system clock when the target frame rate has decreased;
   determines whether the clock speed associated with the system clock has changed by an amount X, wherein the amount X is a pre-determined percentage associated with the system clock;
   sets the clock speed of the bus to the clock speed associated with the system clock when the system clock has changed by the amount X;
   determines whether:
      (A) the frame rate is less than the target frame rate for the viewfinder multiplied by a tolerance factor; and
      (B) an average update time associated with the viewfinder is greater than a preset update time, wherein the average update time refers to an average amount of time that it takes the viewfinder to display a video frame;
   increases an up_resource_vote value each time that (A) and (B) are true;
   increases the clock speed of the bus when the up_resource_vote value equals a first pre-defined threshold associated with the up_resource_vote value;
   if either (A) or (B) is not true, determines whether:
      (C) the average update time has reduced by an amount Y, wherein Y is a pre-determined percentage associated with the update time; and
      (D) the average update time is less than a second preset update time;
   increases a down_resource_vote value each time that either (A) or (B) is not true and (C) and (D) are true; and
   decreases the clock speed of the bus when the down_resource_vote value equals a second pre-defined threshold associated with the down_resource_vote value.

19. The apparatus of claim 18, wherein the first and second preset update times are defined by adjustable values.

20. The apparatus of claim 18, wherein the first and second pre-defined thresholds are defined by adjustable values.

21. The apparatus of claim 11, wherein the apparatus comprises a wireless handset.

22. A non-transitory computer-readable storage medium comprising instructions that upon execution in a digital camera device, cause the device to:
   determine a frame rate of video frames displayed on a viewfinder;
   determine whether to adjust a clock speed of a bus based at least in part on the determined frame rate, wherein the bus is used to transfer the frames from a camera sensor to the viewfinder; and
   adjust the clock speed of the bus upon determining that that the clock speed should be adjusted.

23. A device comprising:
   means for capturing video frames of video data;
   means for displaying the frames to a user;
   means for transferring the frames from the means for capturing to the means for displaying; and
   means for controlling the means for transferring, wherein the means for controlling:
      determines a frame rate of frames displayed on the means for displaying;
      determines whether to adjust a clock speed of the means for transferring based at least in part on the determined frame rate; and
      adjusts the clock speed of the means for transferring upon determining that that the clock speed should be adjusted.

24. An integrated circuit configured to:
   determine a frame rate of video frames displayed on a viewfinder;
   determine whether to adjust a clock speed of a bus based at least in part on the determined frame rate, wherein the bus is used to transfer the frames from a camera sensor to the viewfinder; and
   adjust the clock speed of the bus upon determining that that the clock speed should be adjusted.

* * * * *